(12) United States Patent
Shurtleff et al.

(10) Patent No.: US 8,939,166 B2
(45) Date of Patent: Jan. 27, 2015

(54) TURBINAL™ HIGH FLOW $CO_2$ DELIVERY SYSTEM

(75) Inventors: James A. Shurtleff, Kingwood, TX (US); Joseph K. Bernacki, Pemberton, NJ (US); Martin O'Toole, Doylestown, PA (US)

(73) Assignee: Air Liquide America Specialty Gases LLC, Houston, TX (US)

( * ) Notice: Subject to any disclaimer, the term of this patent is extended or adjusted under 35 U.S.C. 154(b) by 191 days.

(21) Appl. No.: 13/556,828

(22) Filed: Jul. 24, 2012

(65) Prior Publication Data

US 2014/0026982 A1    Jan. 30, 2014

(51) Int. Cl.
*G05D 11/00* (2006.01)

(52) U.S. Cl.
USPC .......... 137/113; 137/87.05; 137/266; 62/50.2

(58) Field of Classification Search
CPC .............. F17C 7/02; F17C 7/04; F17C 13/045
USPC .............. 137/101.25, 113, 266, 87.02, 87.03, 137/87.05; 222/145.1, 146.2, 3; 62/50.2, 62/50.4
See application file for complete search history.

(56) References Cited

U.S. PATENT DOCUMENTS

| | | | |
|---|---|---|---|
| 2,539,291 A * | 1/1951 | Williamson et al. | 62/50.2 |
| 2,547,823 A * | 4/1951 | Josephian | 137/113 |
| 3,258,619 A | 6/1966 | Davidson | |
| 4,247,018 A * | 1/1981 | Credle | 222/1 |
| 4,380,242 A * | 4/1983 | Bresie et al. | 137/113 |
| 4,597,406 A * | 7/1986 | Loiseau et al. | 137/113 |
| 6,763,843 B1 * | 7/2004 | Dickerson et al. | 137/1 |

OTHER PUBLICATIONS

Air Liquide America Specialty Gases, TurbinAL™ webpage, accessed at http://www.alspecialtygases.com/turbinal_continuous_co2_delivery.aspx in 2012.
Air Liquide America Specialty Gases, TurbinAL™ webpage, accessed at http://www.alspecialtygases.com/files/TurbinALCO2_Purge_System_3621.pdf in 2012.

(Continued)

*Primary Examiner* — John K Fristoe, Jr.
*Assistant Examiner* — Robert K. Arundale
(74) *Attorney, Agent, or Firm* — Allen E. White; Justin K. Murray

(57) ABSTRACT

TurbinAL™ is a high-flow carbon dioxide system providing continuous, pressure and temperature regulated gas supply of carbon dioxide for turbine system purging. In a preferred embodiment, the TurbinAL™ system has:
a) Four or more dip-tube equipped carbon dioxide cylinder six- or sixteen-packs with integral check valves, flow restriction orifices, and single outlet manifolds;
b) Two flow manifolds which are connected to the packs with flexible gas safety lines;
c) A transducer controlled automatic switchover manifold that switches gas flow from one flow manifold to the other with no interruption in gas flow;
d) An electric heater system designed to vaporize liquid carbon dioxide drawn from a cylinder (via the dip tube) to be supplied to the turbines as a temperature controlled gas;
e) A programmable logic controller (PLC) to automatically control and monitor system functions; and
f) A flow control device to prevent excess flow to the turbine(s).

20 Claims, 1 Drawing Sheet

(56) References Cited

OTHER PUBLICATIONS

"TurbinAL™ Continuous High-Flow $CO_2$ Purge System for Turbine Generators" webpage, accessed on Oct. 2, 2012 at http://www.alspecialtygases.com/turbinal_continuous_co2_delivery.aspx, 2 pgs.

"TurbinAL™ Continuous High-Flow $CO_2$ Purge System for Turbine Generators" brochure; American Air Liquide Specialty Gases LLC, Mar. 2012, 2 pgs.

* cited by examiner

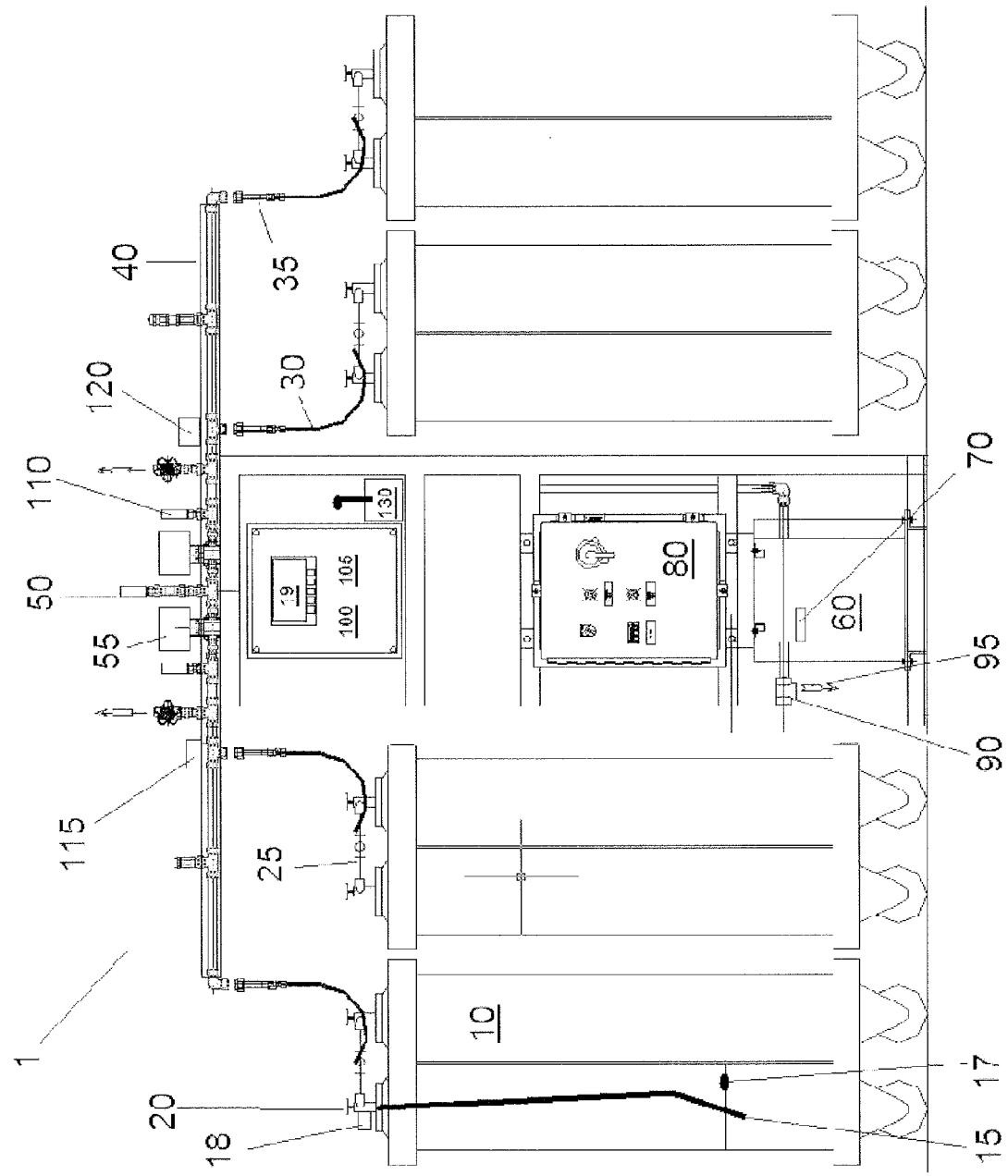

TURBINAL™ HIGH FLOW CO₂ DELIVERY SYSTEM

FIELD OF INVENTION

The invention pertains to purging hydrogen gas from turbine bearings using carbon dioxide.

BACKGROUND

Hydrogen gas is frequently used to cool bearings in gas-fired turbine generators. These generators require periodic service which involves access into the turbine. Prior to entry into the turbine, the hydrogen must be purged. Carbon dioxide is used as an intermediate gas to purge the hydrogen. This prevents direct contact between the hydrogen and air to prevent a combustible mixture of hydrogen and oxygen. Once hydrogen is purged to safe levels, the carbon dioxide is then purged using air. The air provides a safe working environment once oxygen and carbon dioxide meet required levels. When service work is complete, the process is reversed. Carbon dioxide is used to purge the air and then the carbon dioxide is purged with hydrogen.

Bulk liquid carbon dioxide systems can be used as the source when turbines are large enough to justify their expense. These systems are fitted with electric heaters to vaporize the liquid carbon dioxide. Bulk gas sources for carbon dioxide purge gas are impractical for smaller turbine generator facilities due to high cost of refrigeration and storage systems along with loss from vaporization and subsequent venting.

Smaller facilities must utilize high pressure carbon dioxide gas cylinders as their supply source. Purging hydrogen with carbon dioxide from cylinders is currently a manual process that is very labor intensive and slow. Due to the nature of carbon dioxide, withdrawal from the high pressure cylinders often results in freezing of lines, valves and regulators; collapse of the head pressure; and even solidification of the liquid in the cylinders to dry ice. Additionally, the cold liquid or gas coming from the cylinders presents a safety risk for personnel and for supply systems. Some carbon dioxide purge gas systems have been fitted in an ad hoc manner with heated regulators and/or electric heaters, but they are still manual, labor intensive and their operation is frequently interrupted or slowed down for cylinder exchanges.

Cylinder freezing and loss of head pressure slows down the purging process and so it is common that cylinders must be replaced long before they are exhausted. Replacement of cylinders before they are exhausted results in significant gas waste. Extreme cold also damages regulators and regulator failure can result in damage to turbine systems. High pressure can also cause leaks in system seals that would result in direct leakage of hydrogen to atmosphere which is what purging is intended to prevent.

Summarizing the problems in the state of the art processes:
They are labor intense manual operations which frequently requires two to three operators working six to fourteen hours to complete a purge depending on the size of the turbine and outside temperature of the cylinders
Low temperature gas from cylinders resulting in damage to supply system components and turbines
Low temperature and high pressures which present an increased risk of injury for system operators manually exchanging cylinders
Possible loss of individual cylinder head pressure resulting in sublimation of liquid carbon dioxide to dry ice
Significantly longer purge time than bulk systems resulting in extended down time for power units which can lengthen the time a turbine is out of service. This can be both a loss of revenue for the turbine operator and a longer loss of power for energy users supplied by power turbines The foregoing represents the state of the art since even before hydrogen cooled turbines became standard. See, e.g., U.S. Pat. No. 3,258,619. The ad hoc augmentation of carbon dioxide delivery with heated regulators and other thermal control elements have had only marginal benefit. In view of the foregoing, there is a clear, long felt need in the art for solutions to address the slow, problematic and gas wasting state of the art.

SUMMARY OF INVENTION

The TurbinAL™ system may be defined in some embodiments by the following numbered sentences:

1. An apparatus for the purging of hydrogen cooling gas from a turbine, the apparatus comprising:
   a) A first and second source of liquid carbon dioxide in fluid communication with a flow manifold,
   b) The flow manifold in fluid communication with a vaporizing heater,
   c) The flow manifold comprising a device configured to switch the source of liquid carbon dioxide into the vaporizing heater from the first source of liquid carbon dioxide to the second source of liquid carbon dioxide or from the second source of liquid carbon dioxide to the first source of liquid carbon dioxide,
   d) The vaporizing heater configured to receive the liquid carbon dioxide from the flow manifold and vaporize the liquid carbon dioxide to a gaseous state,
   e) An outlet in fluid communication with the vaporizing heater, the outlet configured to deliver gaseous carbon dioxide from the vaporizing heater,
   f) One or both of
      A) a pressure sensor adapted to detect a liquid carbon dioxide pressure in the first or second source of liquid carbon dioxide and configured to send a signal to a controller and
      B) a flow rate measurement device adapted to sense a loss of liquid carbon dioxide flow rate corresponding to a loss of pressure and configured to send a signal to the controller,
   g) The controller configured to
      A) receive the signal from the pressure transducer and
      B) to actuate the device configured to switch the source of liquid carbon dioxide in response the signal from the pressure transducer, the flow rate measurement device, or both, to thereby switch the source of liquid carbon dioxide in fluid communication with the vaporizing heater through the manifold.

2. The apparatus of sentence 1, wherein the first and second source of liquid carbon dioxide comprise a liquid carbon dioxide cylinder, the liquid carbon dioxide cylinder comprising a cylinder valve head having a shut off valve, a flow rate control valve, or both.

3. The apparatus of sentence 1 or 2, wherein the first and second sources of liquid carbon dioxide each comprise two or more liquid carbon dioxide cylinders and the two or more liquid carbon dioxide cylinders are in fluid communication through a cylinder manifold.

4. The apparatus of sentence 1, 2 or 3, wherein the first and second sources of liquid carbon dioxide each comprise six liquid carbon dioxide cylinders.

5. The apparatus of sentence 1, 2, 3 or 4, wherein the first and second sources of liquid carbon dioxide each comprise sixteen liquid carbon dioxide cylinders.

6. The apparatus of sentence 1, 2, 3, 4 or 5 wherein the first and second source of liquid carbon dioxide have an associated first and second flow manifold in fluid communication with the respective first and second source of liquid carbon dioxide.

7. The apparatus of sentence 1, 2, 3, 4, 5 or 6 wherein the first and second source of liquid carbon dioxide are in fluid communication with the flow manifold through an intermediate cryogenic liquid cylinder hose or a pigtail connection.

8. The apparatus of sentence 1, 2, 3, 4, 5, 6 or 7 wherein the device configured to switch the source of liquid carbon dioxide into the vaporizing heater from the first source of liquid carbon dioxide to the second source of liquid carbon dioxide, or from the second source of liquid carbon dioxide to the first source of liquid carbon dioxide, is a switchover manifold configured to open and close a fluid communication path from the first and second sources of liquid carbon dioxide.

9. The apparatus of sentence 1, 2, 3, 4, 5, 6, 7 or 8, wherein the first and second source of liquid carbon dioxide have an associated first and second flow manifold in fluid communication with the respective first and second source of liquid carbon dioxide, and the switchover manifold configured to open one flow manifold and close the other flow manifold to thereby open and close the fluid communication path from the first and second sources of liquid carbon dioxide.

10. The apparatus of sentence 1, 2, 3, 4, 5, 6, 7, 8, or 9, wherein the vaporizing heater is further configured to produce a gaseous carbon dioxide having a temperature in the range of −10 to 100 degrees C.

11. The apparatus of sentence 1, 2, 3, 4, 5, 6, 7, 8, 9 or 10, wherein the vaporizing heater is further configured to produce a gaseous carbon dioxide having a temperature in the range of 25±10 degrees C.

12. The apparatus of sentence 1, 2, 3, 4, 5, 6, 7, 8, 9, 10 or 11, further comprising a temperature sensor configured to measure the temperature of the gaseous carbon dioxide produced by the vaporizing heater.

13. The apparatus of sentence 1, 2, 3, 4, 5, 6, 7, 8, 9, 10, 11 or 12, further comprising a second temperature sensor configured to measure the temperature of the liquid carbon dioxide entering the vaporizing heater.

14. The apparatus of sentence 1, 2, 3, 4, 5, 6, 7, 8, 9, 10, 11, 12 or 13, wherein the temperature sensor is in electronic communication with a controller and adapted to transmit the temperature of the gaseous carbon dioxide to the controller.

15. The apparatus of sentence 1, 2, 3, 4, 5, 6, 7, 8, 9, 10, 11, 12, 13 or 14, further comprising a separate vaporizing heater control panel configured for inputting temperature parameters and operating the vaporizer.

16. The apparatus of sentence 1, 2, 3, 4, 5, 6, 7, 8, 9, 10, 11, 12, 13, 14 or 15, wherein the separate vaporizing heater control panel is in electronic communication with distinct electronics configured to control the vaporization temperature parameters and vaporizer function in response to inputs from the separate vaporizing heater control panel.

17. The apparatus of sentence 1, 2, 3, 4, 5, 6, 7, 8, 9, 10, 11, 12, 13, 14, 15 or 16, further comprising one or more of an outlet shut off valve, an outlet flow rate control valve, an outlet pressure regulator and a safety relief valve.

18. The apparatus of sentence 1, 2, 3, 4, 5, 6, 7, 8, 9, 10, 11, 12, 13, 14, 15, 16 or 17, comprising a pressure sensor adapted to detect a liquid carbon dioxide pressure in the first or second source of liquid carbon dioxide and configured to send a signal to the controller wherein the controller is a programmed logic controller (PLC) specifically adapted to actuate the device configured to switch the source of liquid carbon dioxide when the signal from the pressure transducer is less than or equal to 1000 psig.

19. The apparatus of sentence 1, 2, 3, 4, 5, 6, 7, 8, 9, 10, 11, 12, 13, 14, 15, 16, 17 or 18, wherein the programmed logic controller (PLC) is specifically adapted to actuate the device configured to switch the source of liquid carbon dioxide when the signal from the pressure transducer is less than or equal to 300 psig.

20. The apparatus of sentence 1, 2, 3, 4, 5, 6, 7, 8, 9, 10, 11, 12, 13, 14, 15, 16, 17, 18 or 19, further comprising a liquid level sensor adapted to detect a liquid carbon dioxide level in the first or second source of liquid carbon dioxide and configured to send a signal to a controller wherein the controller is specifically adapted to actuate the device configured to switch the source of liquid carbon dioxide when the liquid level is at or below a pre-set minimum value.

21. The apparatus of sentence 1, 2, 3, 4, 5, 6, 7, 8, 9, 10, 11, 12, 13, 14, 15, 16, 17, 18, 19 or 20, further comprising a telemetric communication system adapted to receive and transmit information from one or more of the controller (100), flow rate measuring devices (115), liquid level sensors (17), or pressure transmitters (110) to a computer (140) specifically adapted to manage a carbon dioxide cylinder inventory and/or replacement carbon dioxide cylinder delivery.

22. An apparatus for the purging of hydrogen cooling gas from a turbine, the apparatus comprising:
   a) A first and second source of liquid carbon dioxide in fluid communication with a flow manifold,
   b) The flow manifold in fluid communication with a vaporizing heater,
   c) The flow manifold comprising a device configured to switch the source of liquid carbon dioxide into the vaporizing heater from the first source of liquid carbon dioxide to the second source of liquid carbon dioxide or from the second source of liquid carbon dioxide to the first source of liquid carbon dioxide,
   d) The vaporizing heater configured to receive the liquid carbon dioxide from the flow manifold and vaporize the liquid carbon dioxide to a gaseous state,
   e) An outlet in fluid communication with the vaporizing heater, the outlet configured to deliver gaseous carbon dioxide from the vaporizing heater,
   f) One or both of
      A) a pressure sensor adapted to detect a liquid carbon dioxide pressure in the first or second source of liquid carbon dioxide and configured to send a signal to a controller,
   g) The controller configured to
      A) receive the signal from the pressure transducer and
      B) to actuate the device configured to switch the source of liquid carbon dioxide in response the signal from the pressure transducer, the flow rate measurement device, or both, to thereby switch the source of liquid carbon dioxide in fluid communication with the vaporizing heater through the manifold.
      C) wherein the controller is a programmed logic controller (PLC) specifically adapted to actuate the device configured to switch the source of liquid carbon dioxide when the signal from the pressure transducer is less than or equal to 1000 psig, and wherein
   h) the first and second sources of liquid carbon dioxide each comprise two or more liquid carbon dioxide cylinders and the two or more liquid carbon dioxide cylinders are in fluid communication through a cylinder manifold, i) the first and second source of liquid carbon dioxide have an associated first and second flow manifold in fluid communication with the respective first and second source of liquid carbon dioxide, j) the first and second source of liquid carbon dioxide are in fluid communication with the flow manifold through an intermediate cryogenic liquid cylinder hose or a pigtail connection, k) the device configured to switch the source of liquid carbon dioxide into the vaporizing heater from the first source of liquid carbon dioxide to the second source of liquid carbon dioxide, or from the second source of liquid carbon dioxide to the first source of liquid carbon dioxide, is a switchover manifold configured to open and close a fluid communication path from the first and second sources of liquid carbon dioxide, l) the vaporizing heater is configured to produce a gaseous carbon dioxide having a temperature in the range of −10 to 100 degrees C., m) a temperature sensor configured to measure the temperature of the gaseous carbon dioxide produced by the vaporizing heater, and n) an outlet flow rate control valve or pressure regulator.

BRIEF DESCRIPTION OF THE DRAWING

FIG. 1 shows one embodiment of the Turbinal System incorporating a variety of optional system components and alternative component devices as indicated by the following index of reference numbers:

Complete apparatus (1)
carbon dioxide cylinders (10)
dip tube (15)
liquid level sensors (17)
devices for displaying the level of liquid cryogen (18) (e.g. a level gauge)
devices for monitoring (19) the level of liquid cryogen (e.g controller (100))
cylinder valve head (20)
cylinder manifold (25)
cryogenic liquid cylinder hose (30) or pigtail (35)
Flow manifolds (40)
Switchover manifold (50)
Motorized ball valve (55)
Vaporizing Heater (60)
Temperature sensor (70)
Vaporizer Controller and Panel (80)
Outlet (90)
Outlet Flow Control (95)
controller (100)
Programmed Logic Controller (105)
Pressure transmitter (110)
flow rate measuring devices (115)
flow rate control devices (120)
telecommunications system (13)

DETAILED DESCRIPTION OF THE INVENTION

TurbinAL™ provides users with a typical tact time reduction of 50% to 75%. Works hours required are reduced from typical levels of eight to thirty hours to an average of four to six hours. Safety is greatly enhanced because cylinder exchanges during purging are reduced by 90% to 100%. The potential for cold liquid or high pressure gas to damage supply systems and turbines is virtually eliminated. Gas cylinders are also able to be fully exhausted eliminating wasted carbon dioxide gas. The forgoing is achieved by use of the TurbinAL™ system. In some embodiments, TurbinAL™ is a fully integrated, cylinder-based high-flow carbon dioxide system providing continuous, pressure and temperature regulated gas supply of carbon dioxide for turbine system purging. In some versions, the system can be configured for automatic or semi-automatic operation. In a preferred embodiment, the TurbinAL™ system has:

Four or more dip-tube equipped carbon dioxide cylinder six- or sixteen-packs with integral check valves, flow restriction orifices, and single outlet manifolds;

Two flow manifolds which are connected to the packs with flexible gas safety lines (such as a Smart-Hose™ cryogenic liquid cylinder hose described in U.S. Pat. No. 5,357,998 and available from Smart-Hose Technologies, Folcroft, Pa.);

A transducer controlled automatic switchover manifold that switches cryogen flow from one flow manifold to the other with no interruption in cryogen flow;

An electric heater system designed to vaporize liquid carbon dioxide drawn from a cylinder (via the dip tube) to be supplied to the turbines as a temperature controlled gas;

Use of cylinders without dip-tubes is not preferred

Temperature sensors for control of the heater;

A programmable logic controller (PLC) to automatically control and monitor system functions;

A flow control device to prevent excess flow to the turbine(s).

Additional components may include:

Optional signal outlets for local and/or remote system monitoring;

An optional telemetry based monitoring system for remote Internet and cell phone based system monitoring and automatic reordering of cylinder packs.

TurbinAL™ System Components

Carbon Dioxide Cylinders (10)

TurbinAL™ may be used with any commercially suitable container capable of containing liquid carbon dioxide. Typically the container will be a high pressure cylinder. It is highly preferred that the cylinder include a dip tube (15) configured to deliver liquid carbon dioxide from the cylinder to the TurbinAL™. Generally the dip tube is configured to extend to the bottom of the cylinder. In another preferred embodiment, the liquid carbon dioxide is in multiple cylinders all in fluid communication with the TurbinAL™ device. In a more preferred version, the multiple cylinders form at least two subgroups of cylinders from which TurbinAL™ draws liquid carbon dioxide in an alternating manner (i.e. from one subgroup of cylinders, then from another subgroup of cylinders). For example, there may be four cylinder subgroups groups each having a cylinder six-pack.

Cylinders may be outfitted with liquid level sensors (17) in communication with devices for displaying (18) (e.g. a level gauge) or monitoring (19) (e.g. controller (100)) the level of liquid cryogen. The monitoring may further include telemetric monitoring via telecommunications system (130) as described below.

Cylinder Valve Head (20) and Cryogenic Liquid Cylinder Hose (30) or Pigtail (35).

The valve head for each cylinder may be any valve head suitable for dispensing liquid carbon dioxide from the cylinder. The valve head may in some embodiments be connected to a suitable cryogenic liquid flexible hose. Groups of cylinders may be connected together by a cylinder manifold (25) with the cylinder manifold connected to the cryogenic liquid cylinder hose. The cylinder valve head or cylinder group manifold may alternatively be connected to flow manifolds via a pigtail such as a stainless steel pigtail.

Flow Manifolds (40)

Flow manifolds are suitable for receiving and transporting liquid carbon dioxide to the heater/vaporizer. The flow manifolds will in most embodiments be in direct fluid communication with the cryogenic liquid cylinder hose (30) or pigtail (35).

Switchover Manifold (50)

The switch over manifold will be configured to open and close each fluid communication path from two or more flow manifolds to the heater/vaporizer. In a preferred embodiment, the switch over manifold will be configured to completely close one fluid communication path from a first source of liquid carbon dioxide and completely open a fluid communication path from a second source of liquid carbon dioxide. However, other embodiments include opening multiple fluid communication paths at once or gradually closing or opening fluid communication paths so that a steady flow rate of liquid carbon dioxide occurs while switching between sources of liquid carbon dioxide.

Vaporizing Heater (60)

The vaporizing heater is configured to receive liquid carbon dioxide, in most embodiments directly from the flow manifolds, and convert the liquid carbon dioxide to gaseous carbon dioxide. The vaporizing heater will preferably be configured to produce a gaseous carbon dioxide having a temperature in the range of −10 to 100 degrees C., with 25±10 degrees C. preferred.

Temperature Sensor (70)

The vaporizer will in most embodiments have a temperature sensor configured to measure the temperature of the gaseous carbon dioxide produced by the vaporizing heater. In some embodiments, a separate temperature sensor may be configured to measure the temperature of the liquid carbon dioxide entering the vaporizing heater. Either or both temperature sensors may be in electronic communication with a controller (100), such as a Programmed Logic Controller (105), to thereby transmit the temperature information to the controller.

Vaporizer Controller and Panel (80)

In some embodiments, the vaporizing heater may have a separate control panel for inputting temperature parameters and/or operating the vaporizer. The separate control panel may be in electronic communication with distinct electronics for controlling the vaporization parameters and vaporizer function, rather than with the controller (100). In such embodiments, the temperature sensor(s) may be in electronic communication with the Vaporizer's distinct electronics for controlling the vaporization parameters and vaporizer function, instead of or in addition to the controller (100).

Outlet (90) Outlet Flow Control (95)

The vaporizing heater will have an outlet for emitting gaseous carbon dioxide. In most embodiments, the outlet will have a shut off valve, flow rate control valve, pressure regulator, or other mechanism to control the delivery of gaseous carbon dioxide. The outlet may also be equipped with a safety relief valve adapted to open if the gaseous carbon dioxide pressure in the vaporizer exceeds a preset safety limit.

Programmed Logic Controller (105)

The controller (100) may be any electronics device capable of responding to the pressure in the flow manifolds or the liquid level sensor reading or both and activate the switchover manifold at the appropriate pressure or liquid level reading (e.g. 300 psig). In many embodiments, the controller will be a Programmed Logic Controller (PLC).

Pressure Transmitter (110)

In most embodiments, the pressure transmitter(s) will be configured to read the pressure of the liquid carbon dioxide in the flow manifold(s). An alternative to pressure transmitters would be for example flow rate measuring devices (115) adapted to sense a loss of liquid carbon dioxide flow rate corresponding to a loss of pressure. These devices will be in electronic communication with the controller (100) to provide the necessary information for the controller to operate the switchover manifold. In some embodiments, the pressure and/or flow rate measurements are also useable to operate flow rate control devices (120) in fluid communication with the flow manifold and configured to control the rate of liquid carbon dioxide delivered to the vaporizing heater.

Telecommunications System for Remote Monitoring and/or Operation (130)

In some embodiments, one or more of the controller (100), flow rate measuring devices (115), liquid level sensors (17), or pressure transmitters (110) are adapted (e.g. by connection to a phone line or by radio transmission) to be in telemetric communication (130) with a computer specifically adapted to manage a carbon dioxide cylinder inventory and/or replacement carbon dioxide cylinder delivery.

TurbinAL™ Purge Process

At the beginning of a typical purge cycle, an operator will start the TurbinAL™ system and allow the heater system to reach its operating temperature. Once the heater has reached its operating temperature, the operator will activate the system's purge operation using a programmable logic controller(s) (PLC) adapted to control operation of a TurbinAL™ system for a purge cycle. Liquid carbon dioxide will begin to flow through the cylinder lines and flow manifold system to the heater. Gas vaporized in the heater system will discharge from the system through a flow restrictor and pressure regulator to provide even flow of gas at working pressures. The carbon dioxide may be delivered at up to 4000 SCFH, with 1400 SCFH being one preferred flow rate setting.

In certain embodiments, if the gas cylinders feeding the system on the starting manifold bank become empty during a purge, the system will automatically switch over to the other flow manifold with no interruption in gas supply. The change over can be triggered by a pressure sensor reading at or below a pre-set value such as 300 psig to ensure uninterrupted carbon dioxide delivery. Once gas levels in the turbine system reach desired levels, the system can be manually or automatically turned off, stopping the flow of carbon dioxide to the turbines. In an automated system, carbon dioxide, hydrogen and/or oxygen sensors in fluid communication with the turbine gas being purged may be in communication with the PLC to trigger shut down of the carbon dioxide flow based upon preset threshold levels (e.g. carbon dioxide reached 95% in purge gas leaving the turbine during a purge). Suitable sensor systems are commercially available for turbine purging operations and include combined hydrogen-in-CO2 and air-in-CO2 sensor systems.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An apparatus for the purging of hydrogen cooling gas from a turbine, the apparatus comprising:
   a) a first and second source of liquid carbon dioxide in fluid communication with a flow manifold,
   b) the flow manifold in fluid communication with a vaporizing heater,
   c) the flow manifold comprising a device configured to switch the source of liquid carbon dioxide into the vaporizing heater from the first source of liquid carbon dioxide to the second source of liquid carbon dioxide or from the second source of liquid carbon dioxide to the first source of liquid carbon dioxide,
   d) the vaporizing heater configured to receive the liquid carbon dioxide from the flow manifold and vaporize the liquid carbon dioxide to a gaseous state,
   e) an outlet in fluid communication with the vaporizing heater, the outlet configured to deliver gaseous carbon dioxide from the vaporizing heater,
   f) one or both of:
      A) a pressure sensor adapted to detect a liquid carbon dioxide pressure in the first or second source of liquid carbon dioxide and configured to send a signal to a controller,
      B) a flow rate measurement device adapted to sense a loss of liquid carbon dioxide flow rate corresponding to a loss of pressure and configured to send a signal to the controller,
   g) the controller configured to
      A) receive the signal from the pressure sensor, if the pressure sensor is present, and
      B) to actuate the device configured to switch the source of liquid carbon dioxide in response the signal from the pressure sensor, the flow rate measurement device, or both, to thereby switch the source of liquid carbon dioxide in fluid communication with the vaporizing heater through the manifold,
   h) a temperature sensor configured to measure the temperature of the gaseous carbon dioxide produced by the vaporizing heater, wherein the temperature sensor is in electronic communication with the controller and adapted to transmit the temperature of the gaseous carbon dioxide to the controller.

2. The apparatus of claim 1, wherein the first and second source of liquid carbon dioxide comprise a liquid carbon dioxide cylinder, the liquid carbon dioxide cylinder comprising a cylinder valve head having a shut off valve, a flow rate control valve, or both.

3. The apparatus of claim 2, wherein the first and second sources of liquid carbon dioxide each comprise two or more liquid carbon dioxide cylinders and the two or more liquid carbon dioxide cylinders are in fluid communication through a cylinder manifold.

4. The apparatus of claim 3, wherein the first and second sources of liquid carbon dioxide each comprise six liquid carbon dioxide cylinders.

5. The apparatus of claim 3, wherein the first and second sources of liquid carbon dioxide each comprise sixteen liquid carbon dioxide cylinders.

6. The apparatus of claim I wherein the first and second source of liquid carbon dioxide have an associated first and second flow manifold in fluid communication with the respective first and second source of liquid carbon dioxide.

7. The apparatus of claim I wherein the first and second source of liquid carbon dioxide are in fluid communication with the flow manifold through an intermediate cryogenic liquid cylinder hose or a pigtail connection.

8. The apparatus of claim 1 wherein the device configured to switch the source of liquid carbon dioxide into the vaporizing heater from the first source of liquid carbon dioxide to the second source of liquid carbon dioxide, or from the second source of liquid carbon dioxide to the first source of liquid carbon dioxide, is a switchover manifold configured to open and close a fluid communication path from the first and second sources of liquid carbon dioxide.

9. The apparatus of claim 8, wherein the first and second source of liquid carbon dioxide have an associated first and second flow manifold in fluid communication with the respective first and second source of liquid carbon dioxide, and the switchover manifold configured to open one flow manifold and close the other flow manifold to thereby open and close the fluid communication path from the first and second sources of liquid carbon dioxide.

10. The apparatus of claim 1, wherein the vaporizing heater is further configured to produce a gaseous carbon dioxide having a temperature in the range of −10 to 100 degrees C.

11. The apparatus of claim 10, wherein the vaporizing heater is further configured to produce a gaseous carbon dioxide having a temperature of 25±10 degrees C.

12. The apparatus of claim 1, further comprising a separate vaporizing heater control panel configured for inputting temperature parameters and operating the vaporizer.

13. The apparatus of claim 12, wherein the separate vaporizing heater control panel is in electronic communication with distinct electronics configured to control the vaporization temperature parameters and vaporizer function in response to inputs from the separate vaporizing heater control panel.

14. The apparatus of claim 1, further comprising one or more of an outlet shut off valve, an outlet flow rate control valve, an outlet pressure regulator and a safety relief valve.

15. The apparatus of claim 1, comprising wherein the controller is a programmed logic controller (PLC) specifically adapted to actuate the device configured to switch the source of liquid carbon dioxide when the signal from the pressure sensor is less than or equal to 1000 psig.

16. The apparatus of claim 15, wherein the programmed logic controller (PLC) is specifically adapted to actuate the device configured to switch the source of liquid carbon dioxide when the signal from the pressure sensor is less than or equal to 300 psig.

17. The apparatus of claim 1, further comprising a liquid level sensor adapted to detect a liquid carbon dioxide level in the first or second source of liquid carbon dioxide and configured to send a signal to a controller Wherein the controller is specifically adapted to actuate the device configured to switch the source of liquid carbon dioxide when the liquid level is at or below a pre-set minimum value.

18. The apparatus of claim 1, further comprising a telemetric communication system adapted to receive and transmit information from an input device to a computer specifically adapted to manage a carbon dioxide cylinder inventory and/or replacement carbon dioxide cylinder delivery, wherein the input device is selected from the group consisting of the controller, flow rate measuring devices, a liquid level sensors, or a pressure transmitter.

19. An apparatus for the purging of hydrogen cooling gas from a turbine, the apparatus comprising:
   a) a fist and second source of liquid carbon dioxide in fluid communication with a flow manifold;
   b) the flow manifold in fluid communication with a vaporizing heater;
   c) the flow manifold comprising a device configured to switch the source of liquid carbon dioxide into the vaporizing heater from the first source of liquid carbon dioxide to the second source of liquid carbon dioxide or from the second source of liquid carbon dioxide to the first source of liquid carbon dioxide;

d) the vaporizing heater configured to receive the liquid carbon dioxide from the flow manifold and vaporize the liquid carbon dioxide to a gaseous state;

e) an outlet in fluid communication with the vaporizing heater, the outlet configured to deliver gaseous carbon dioxide from the vaporizing heater;

f) one or both of:
  A) a pressure sensor adapted to detect a liquid carbon dioxide pressure in the first or second source of liquid carbon dioxide and configured to send a signal to a controller;
  B) a flow rate measurement device adapted to sense a loss of liquid carbon dioxide flow rate corresponding to a loss of pressure and configured to send a signal to the controller;

g) the controller configured to:
  A) receive the signal from the pressure sensor, if the pressure is present, and
  B) to actuate the device configured to switch the source of liquid carbon dioxide in response the signal from the pressure sensor, the flow rate measurement device, or both, to thereby switch the source of liquid carbon dioxide in fluid communication with the vaporizing heater through the manifold;

h) a temperature sensor configured to measure the temperature of the gaseous carbon dioxide produced by the vaporizing heater; and i) a second temperature sensor configured to measure the temperature of the liquid carbon. dioxide entering the vaporizing heater.

20. An apparatus for the purging of hydrogen cooling gas from a turbine, the apparatus comprising:

a) a first and second source of liquid carbon dioxide in fluid communication with a flow manifold, b) the flow manifold in fluid communication with a vaporizing heater, c) the flow manifold comprising a device configured to switch the source of liquid carbon dioxide into the vaporizing heater from the first source of liquid carbon dioxide to the second source of liquid carbon dioxide or from the second source of liquid carbon dioxide to the first source of liquid carbon dioxide, d) the vaporizing heater configured to receive the liquid carbon dioxide from the flow manifold and vaporize the liquid carbon dioxide to a gaseous state, e) an outlet in fluid communication with the vaporizing heater, the outlet configured to deliver gaseous carbon dioxide from the vaporizing heater, f) one or both of
  A) a pressure sensor adapted to detect a liquid carbon dioxide pressure in the first or second source of liquid carbon dioxide and configured to send a signal to a controller,
  B) a flow rate measurement device adapted to sense a loss of liquid carbon dioxide flow rate corresponding to a loss of pressure and configured to send a signal to the controller, g) the controller configured to
  A) receive the signal from the pressure sensor, if the pressure sensor is present, and
  B) to actuate the device configured to switch the source of liquid carbon dioxide in response the signal from the pressure sensor, the flow rate measurement device, or both, to thereby switch the source of liquid carbon dioxide in fluid communication with the vaporizing heater through the manifold,
  C) wherein the controller is a programmed logic controller (PLC) specifically adapted to actuate the device configured to switch the source of liquid carbon dioxide when the signal from the pressure sensor is less than or equal to 1000 psig, and wherein h) the first and second sources of liquid carbon dioxide each comprise two or more liquid carbon dioxide cylinders and the two or more liquid carbon dioxide cylinders are in fluid communication through a cylinder manifold, i) the first and second source of liquid carbon dioxide have an associated first and second flow manifold in fluid communication with the respective first and second source of liquid carbon dioxide, j) the first and second source of liquid carbon dioxide are in fluid communication with the flow manifold through an intermediate cryogenic liquid cylinder hose or a pigtail connection, k) the device configured to switch the source of liquid carbon dioxide into the vaporizing heater from the first source of liquid carbon dioxide to the second source of liquid carbon dioxide, or from the second source of liquid carbon dioxide to the first source of liquid carbon dioxide, is a switchover manifold configured to open and close a fluid communication path from the first and second sources of liquid carbon dioxide, l) the vaporizing heater is configured to produce a gaseous carbon dioxide having a temperature in the range of −10 to 100 degrees C., m) a temperature sensor configured to measure the temperature of the gaseous carbon dioxide produced by the vaporizing heater, wherein the temperature sensor is in electronic communication with the controller and adapted to transmit the temperature of the gaseous carbon dioxide to the controller, and n) an outlet flow rate control valve or pressure regulator.

* * * * *